HYDRAULIC BRAKE AND STEERING SYSTEM FOR VEHICLES

Original Filed July 31, 1964 Sheet 1 of 2

INVENTORS
FREDERICK C. KLAUS
BY JACKSON C. MEDLEY
Fryer and Eimwold
ATTORNEYS

HYDRAULIC BRAKE AND STEERING SYSTEM FOR VEHICLES

Original Filed July 31, 1964 Sheet 2 of 3

INVENTORS
FREDERICK C. KLAUS
BY JACKSON C. MEDLEY
Fryer and Zimmerman
ATTORNEYS

United States Patent Office

Re. 26,513
Reissued Dec. 31, 1968

26,513
HYDRAULIC BRAKE AND STEERING SYSTEM FOR VEHICLES

Frederick C. Klaus, Joliet, and Jackson C. Medley, East Peoria, Ill., assignors to Caterpillar Tractor Co., Peoria, Ill., a corporation of California Original No. 3,278,239, dated Oct. 11, 1966, Ser. No. 386,522, July 31, 1964. Application for reissue Mar. 17, 1967, Ser. No. 637,025
5 Claims. (Cl. 180—79.2)

Matter enclosed in heavy brackets [ ] appears in the original patent but forms no part of this reissue specification; matter printed in italics indicates the additions made by reissue.

This invention relates to hydraulic systems for use in vehicle brakes and steering apparatus and particularly to a system to insure dependability and safety in large vehicles.

The larger units of various types of earthmoving machinery have presented steering and particularly braking problems arising from the weight of the apparatus and load and relatively high operating speeds. The trend is now toward even greater size and it is contemplated, for example, that trucks will carry loads in the order of seventy-five to one hundred tons.

Ordinary mechanical braking and steering systems are obviously inadequate for such large equipment and cannot safely be relied upon even for emergency purposes. Systems are known where hydraulic pressure derived from an engine driven pump is utilized for braking and steering. Some such systems include an auxiliary pump utilizing a different source of power which is effective when the engine is shut down. However, such equipment is costly and subject to damage and mechanical failure so that it cannot be relied upon to provide maximum dependability and safety.

It is an object of the present invention to provide a hydraulic brake and steering system which is highly dependable and safe even in the event of damage to or failure of some of its components.

A further object of the invention is to provide a system which includes two separate sources of reserve fluid pressure each of which is capable of steering or braking a vehicle upon failure of the other, and each of which is separately associated with different parts of the braking and steering systems to insure operation in the event of failure of components in either such part.

A still further object resides in the provision with a system of the kind described of an auxiliary brake biased toward an applied position but restrained against such bias by pressure in either of said sources of reserve fluid pressure whereby failure of both of said sources will result in application of the brake.

Further objects and advantages of this invention and the manner in which it is carried into practice are made apparent in the following specification wherein reference is made to the accompanying drawings.

Figure 1:
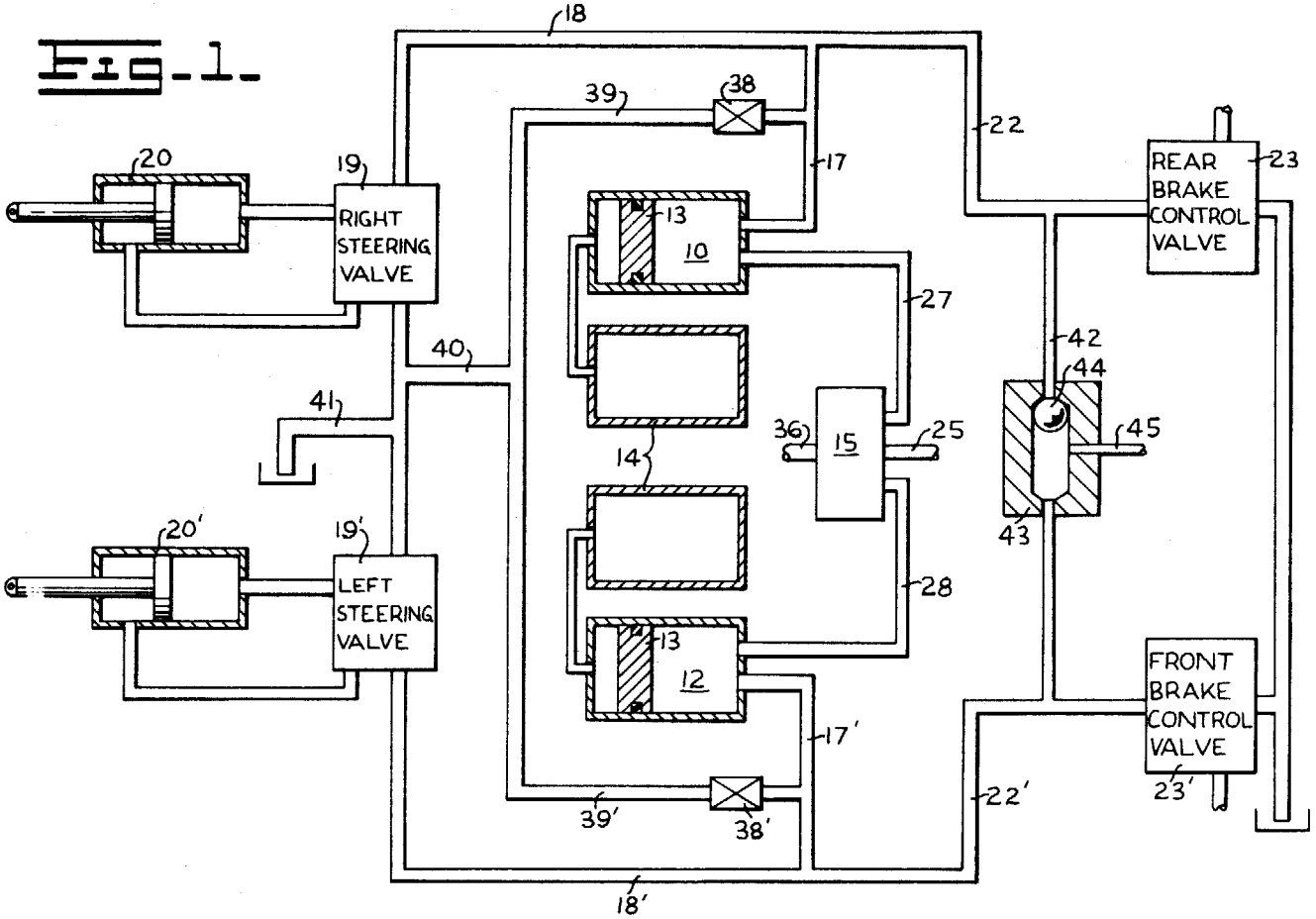
FIG. 1 is a diagrammatic view of a fluid circuit which forms a part of the brake and steering system of the present invention.

In the schematic view of FIG. 1 fluid under pressure for actuating brakes and for effecting steering of a vehicle is stored in a pair of accumulators 10 and 12. Each accumulator is in the form of a cylinder with a free sliding piston 13 and each cylinder is precharged with gas under pressure from an associated tank of gas such as shown at 14. Hydraulic fluid under pressure from a pump (not shown) and directed toward the accumulators 10 and 12 by a conventional accumulator charging valve (also not shown) is received through a selector valve 15, presently described in detail, which serves to direct fluid to either of the accumulators in which pressure has dropped below a predetermined level. The accumulator 10 is connected as by lines 17 and 18 with the right hand steering valve 19 which directs fluid selectively to opposite ends of a right hand steering cylinder 20. Similar lines 17' and 18' direct fluid from the accumulator 12 to a left hand steering valve 19' which controls a left hand steering cylinder 20'. The steering system is generally conventional and of the type wherein steering movement to either hand of a wheel will open both valves 19 and 19' for directing fluid to opposite ends of the cylinders 20 and 20'. Mechanical steering linkage in such systems is such that either one of the steering cylinders will effect steering, though both are desired for ordinary steering operations.

Just as the accumulators 10 and 12 provide fluid under pressure for operation of two steering valves, either one of which can be used for steering in emergency, they also supply pressure to separate brake control valves. As shown in FIG. 1 accumulator 10 supplies pressure through a line 22 to a rear brake control valve 23 while accumulator 12 supplies pressure through line 22' to a front brake control valve 23'. As in most conventional systems actuation of a brake pedal opens both valves 23 and 23' to apply rear brakes and front brakes alike. However, in the present system any failure of pressure from either of the accumulators 10 or 12 will still make possible the application of brakes served by the other accumulator.

Figure 2:
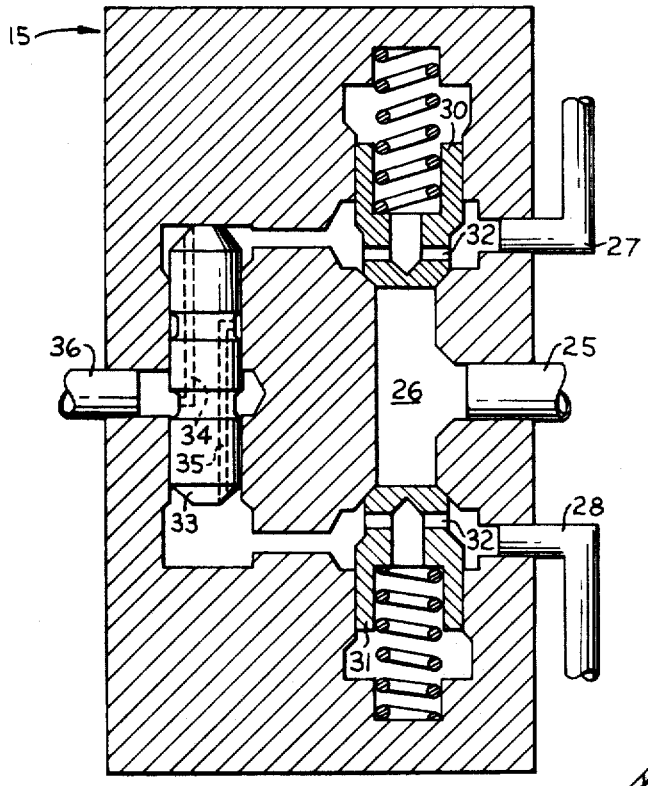
FIG. 2 is a schematic sectional view of a selector valve shown in FIG. 1.

The operation of the selector valve 15 will best be understood by reference to FIG. 2. Fluid pressure enters the valve through a line 25 communicating with the accumulator charging valve or other source of a pressure (not shown) and from a chamber 26 will be directed to accumulator 10 by a line 27, or the accumulator 12 by a line 28, depending upon the existing pressures in the accumulators. Each of the accumulator lines 27 and 28 is normally closed by a spring loaded check valve 30 or 31, respectively, and the pressure in the accumulator is also transmitted to the spring chambers of the check valves through orifices 32. Consequently, the check valves serving the accumulator having the lowest pressure will open first to admit fluid under pressure. Some accumulator charging valves are opened by sensing low pressure at the accumulator and in order to indicate low pressure the present selector valve includes a shuttle valve having a sliding spool 33. When low pressure exists in one accumulator the higher pressure in the other moves the spool to one end of the bore as it has been moved by high pressure in the accumulator 12 as shown in FIG. 2. In this position, the low pressure in accumulator 10 is sensed through the passage 34 and a line 36 which may communicate with the accumulator charging valve. Similarly, when the higher pressure exists in accumulator 10, spool 33 is urged downwardly and low pressure in accumulator 12 is sensed through passage 35 and line 36.

Bleeding of either side of the system may be accomplished by valves 38 and 38' opening branch lines 39 and 39' which communicate with a reservoir or tank through lines 40 and 41.

Figure 3:
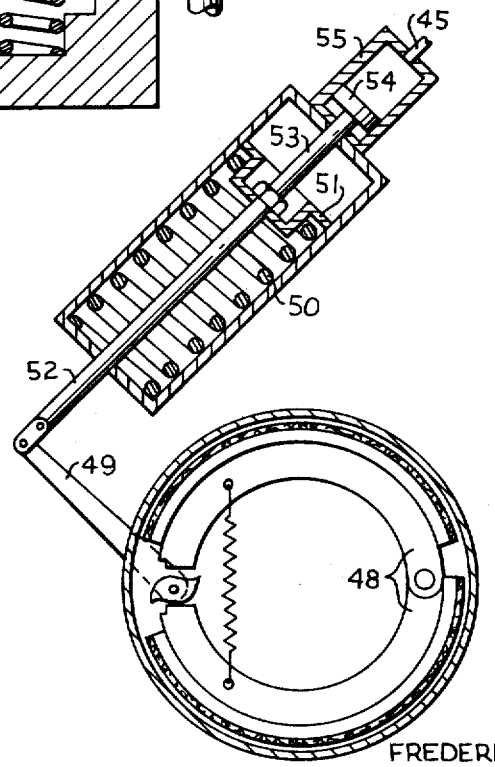
FIG. 3 is a schematic view of an auxiliary brake which is associated with the circuit shown in FIG. 1.

The two sides of the system which communicate with the separate accumulators 10 and 12 are interconnected by a line 42 in which a shuttle valve 43 is disposed. A valve element 44 in the shuttle valve is moved by greater pressure on either side of the system to close the other side of the system and expose the greater pressure to a line 45 which may be employed to serve other fluid actuated components of the vehicle; for example, tail gate mechanism, etc. In this connection an auxiliary brake is also provided to be applied automatically in the event of pressure failure in both sides of the system served separately by the two accumulators. Such a brake is schematically illustrated in FIG. 3 as having brake shoes 48 biased toward a braking condition by linkage 49 and a spring 50 acting on a piston 51. The rod 52 of this piston has an extension 53 with a piston 54 in a cylinder 55. The cylinder 55 is charged with oil under pressure from the line 45 leading from the shuttle valve (see FIG. 1) to oppose the bias of the spring 50. Consequently, upon failure of pressure in line 45 which will occur only upon failure of both accumulators and brake systems of FIG. 1 the auxiliary brake will be applied.

What is claimed is:

1. A hydraulic brake and steering system for a vehicle having separate hydraulic circuits for front brakes and rear brakes, comprising separate sources of fluid under pressure, a first fluid circuit including one source and the front brakes, a second fluid circuit including the other source and the rear brakes, a passage communicating pressure between said circuits, valve means in said passage operable by pressure in either circuit which exceeds pressure in the other circuit to close said passage, an auxiliary circuit in communication with said passage, said valve means being operable when the pressure is higher in one circuit to close communication between the auxiliary circuit and the other circuit, an auxiliary brake, a spring means biasing the auxiliary brake toward engagement, and pressure responsive means actuated by pressure in the auxiliary circuit opposing the spring means whereby upon failure of pressure in the first and second circuits pressure in the auxiliary circuit will fail and the auxiliary brake will be engaged.

2. A hydraulic brake and steering system for a vehicle having separate hydraulic circuits for front brakes and rear brakes, comprising separate sources of fluid under pressure, a first fluid circuit including one source and the front brakes, a second fluid circuit including the other source and the rear brakes, a passage communicating pressure between said circuits, valve means in said passage operable by pressure in either circuit which exceeds pressure in the other circuit to close said passage, the separate sources of fluid under pressure being accumulators, means communicating the accumulators with a source of fluid under pressure, and a selector valve in said last means to direct fluid to the accumulator having the lower pressure.

*3. The combination of claim 2 where the vehicle also has first and second hydraulic steering motors for simultaneously or independently effecting vehicle steering and wherein said first fluid circuit includes the first hydraulic steering motor and said second fluid circuit includes the second hydraulic steering motor.*

*4. A hydraulic brake and steering system for a vehicle having separate hydraulic brake systems associated with separate axles of the vehicle and first and second hydraulic steering motors capable of simultaneously and independently effecting vehicle steering, comprising first and second sources of fluid under pressure, a first fluid circuit including said first fluid source, the first hydraulic steering motor and a first brake system and a second fluid circuit including said second fluid source, the second hydraulic steering motor and a second brake system.*

*5. A hydraulic steering system for a vehicle having first and second hydraulic steering motors capable of simultaneously and independently effecting vehicle steering, comprising first and second sources of fluid under pressure which are associated for common operation, a first fluid circuit including said first fluid source and the first hydraulic steering motor and a second fluid circuit including said second fluid source and the second hydraulic steering motor, the fluid source and motor of each circuit being isolated from fluid communication with the other circuit.*

References Cited

The following references, cited by the Examiner, are of record in the patented file of this patent or the original patent.

UNITED STATES PATENTS

| | | | |
|---|---|---|---|
| 1,792,895 | 2/1931 | Cowlishaw | 303—63 |
| 2,848,246 | 11/1958 | Ruf | 280—91 |
| 2,896,733 | 7/1959 | Rockwell | 180—79.2 |
| 2,918,135 | 12/1959 | Wittren | 180—79.2 |
| 3,088,284 | 5/1963 | Aaron | 303—9 X |

FOREIGN PATENTS

| | | |
|---|---|---|
| 728,968 | 1/1966 | Canada. |
| 946,208 | 7/1956 | Germany. |
| 1,133,264 | 7/1956 | Germany. |

KENNETH H. BETTS, *Primary Examiner.*

U.S. Cl. X.R.

60—52